INVENTOR.
HARRY A. TOULMIN, JR.
BY
Toulmin & Toulmin
Attorneys

INVENTOR.
HARRY A. TOULMIN, JR.
BY
Toulmin & Toulmin
Attorneys

INVENTOR
HARRY A. TOULMIN, JR.
BY Toulmin & Toulmin
ATTORNEYS

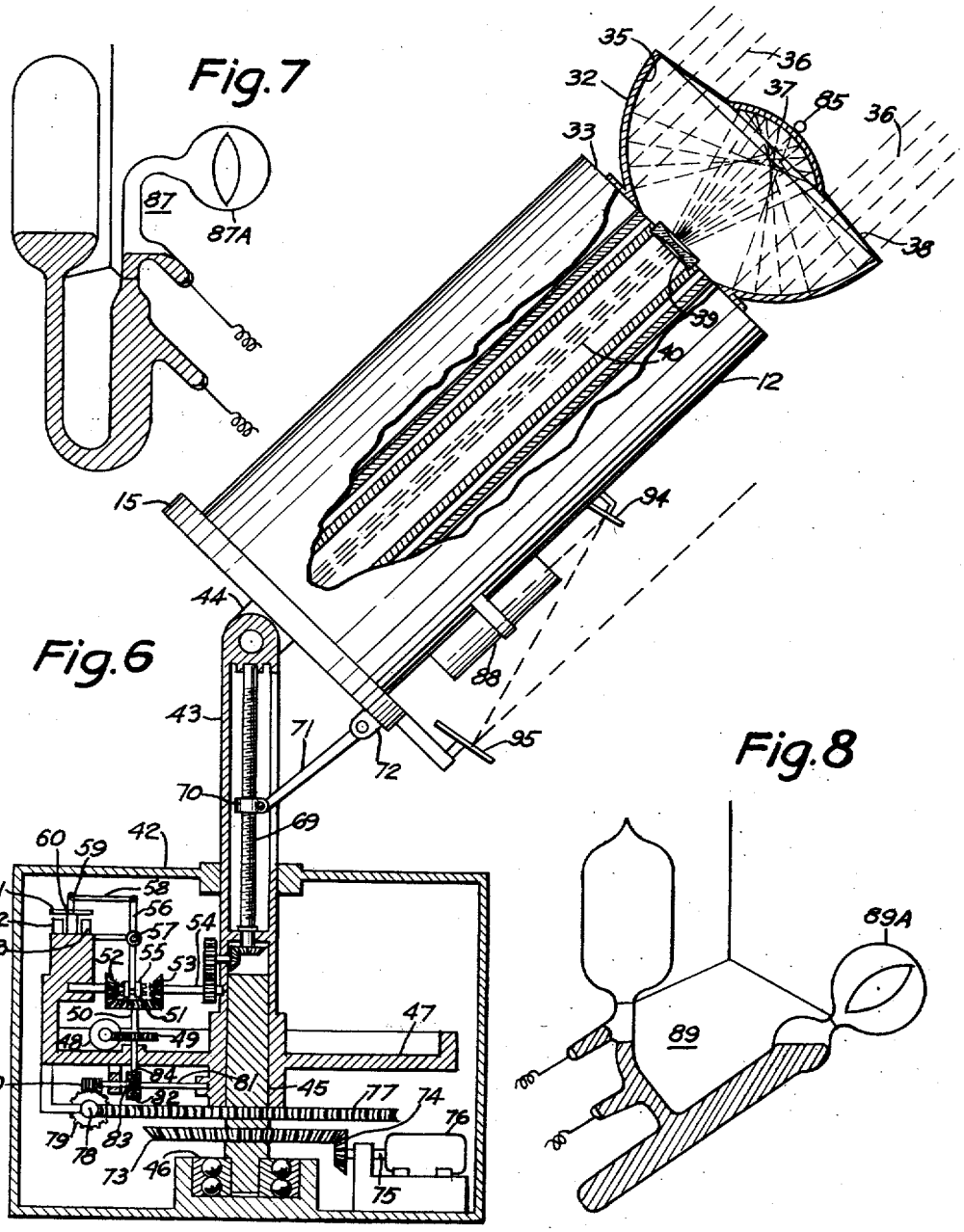
INVENTOR.
HARRY A. TOULMIN, JR.
BY
Toulmin & Toulmin
Attorneys

INVENTOR.
HARRY A. TOULMIN, JR.
BY
Toulmin & Toulmin
Attorneys

United States Patent Office

Re. 25,2

Reissued Sept. 11, 1

25,242

METHOD AND APPARATUS FOR GENERATING ELECTRICAL POWER FROM SOLAR ENERGY

Harry A. Toulmin, Jr., Dayton, Ohio, assignor, by mesne assignments, to Basic Research Corporation, Wilmington, Del., a corporation of Delaware Original No. 2,864,879, dated Dec. 16, 1958, Ser. No. 476,696, Dec. 21, 1954. Application for reissue Feb. 13, 1959, Ser. No. 793,226

14 Claims. (Cl. 136—4)

Matter enclosed in heavy brackets [ ] appears in the original patent but forms no part of this reissue specification; matter printed in italics indicates the additions made by reissue.

The present invention relates to solar energy, more particularly to an apparatus for producing electrical power from solar energy.

It has long been recognized that great quantities of solar energy are received daily upon the surface of the earth. Considerable time and effort have been expended upon the problem of harnessing solar energy. To date considerable progress has been made in devising reflectors which concentrate the heat rays from the sun at a single point. The high temperatures which result in this concentration of the heat rays have been subsequently used in metallurgical experiments and the like primarily in an effort to discover high heat resistant materials.

Some consideration has also been given to the conversion of solar energy into forms of energy, which may be utilized by industry, in order to provide additional sources of power. Several forms of solar batteries have already been proposed. However, these batteries are capable of generating very small quantities of electricity. In addition, the conventional battery does not rely upon the concentration of the rays of the sun but employs the direct rays of the sun to energize elements which are similar to thermo-couple junctions. Moreover, these elements are extremely delicate and pose many problems in constructing practicable solar batteries.

The present invention is directed to an apparatus for producing electricity from solar energy which is simple in construction and capable of generating sufficient quantities of electricity to power electric motors and the [line] *like*. This solar generating apparatus essentially comprises a plurality of thermo-electric elements arranged to *define a chamber, for example* [form] a hollow cylinder. The inner ends of the thermo-electric elements are energized by concentrated solar heat rays. The outer ends of the elements are cooled by any suitable means. The result is that a temperature gradient is formed in each of these elements. This temperature gradient, in turn, generates an E.M.F. in each of the elements. The elements are electrically connected together so as to combine all of the generated E.M.F.'s, whereby the resultant electric power is sufficient to form a practicable source of power.

In addition, a heliostat mechanism is provided which maintains the reflector of the solar generator directed at the sun at all times. This mechanism is actuated by the sun and is automatic in operation.

Several modifications of the present invention are also disclosed. These modifications include a structure which enables the solar apparatus to simultaneously generate steam along with the production of electric power. Furthermore, the concentrated solar heat rays may be utilized in various ways in order to energize the thermo-electric elements. These structures will be set forth in detail in the detailed description of this invention.

It is, therefore, the principal object of this invention to provide a novel method and apparatus for producing electric power from solar energy.

It is another object of this invention to provide a solar generator which is efficient in operation and simpl construction.

It is a further object of this invention to provide a s generator which comprises a plurality of thermo-ele elements efficiently arranged to be energized by con trated solar energy.

It is an additional object of this invention to provi novel method and apparatus for concentrating heat from the sun in order to generate electrical power th from.

It is still another object of this invention to provi solar generator wherein the electrical power gener may be closely regulated.

Other objects and advantages of this invention will come apparent upon reference to the following des tion when taken in conjunction with the accompan drawings wherein:

FIGURE 6 is a partial sectional view taken along lines 6—6 of FIGURE 1 and showing the details o driving mechanism of the heliostat with a portion o solar generator removed to illustrate the paths of the heat rays;

FIGURES 7 and 8 are diagrammatic views of the cury vapor switches employed in the focusing mechan

Figure 1:
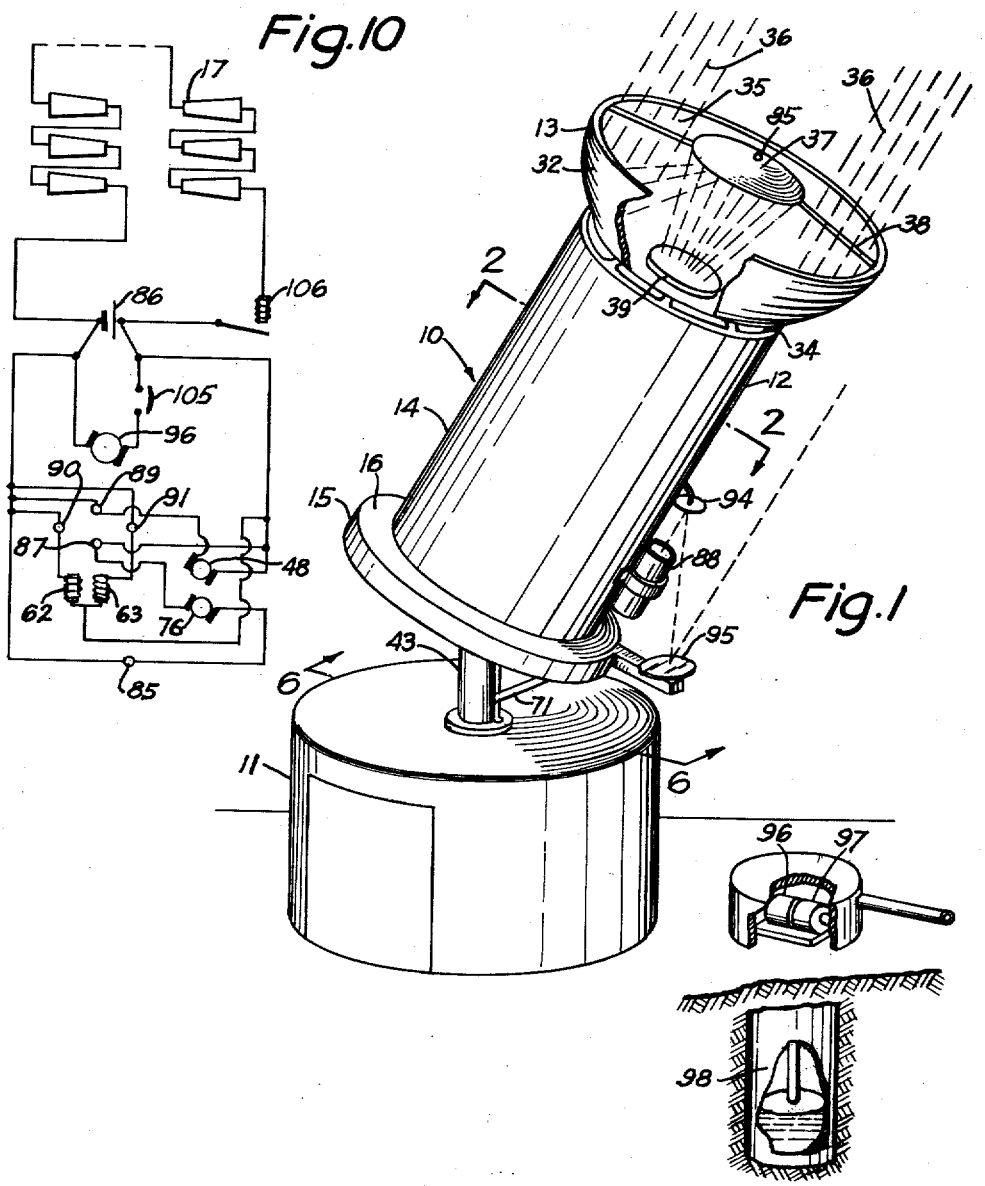
FIGURE 1 is a perspective view of the solar genera apparatus.

FIGURE 10 is a diagram of the electrical circuit ployed with this solar generating apparatus; and FIGURES 11 to 14 are diagrammatic views of m fications of the disclosed embodiment of this inventic Returning now to the drawings, more particularl FIGURE 1, wherein like reference symbols indicate same parts throughout the various views, the solar en apparatus disclosed in this invention comprises a generator indicated generally at 10, mounted up heliostat mechanism 11. The solar generator 10, in comprises a generator unit 12, upon which is support solar heat ray concentration system 13. The structu each of these components, together with their intertionship will be subsequently described in detail.

The generator unit 12 comprises a cylindrical outer ing 14 mounted upon a base 15 the peripheral edge which extend beyond the circumference of the outer ing 14 to form a flange 16.

The cylindrical casing 14 is almost completely occu by a plurality of thermo-electric elements 17, such as closed in U. S. Patent No. 2,280,137. These thermo-tric elements are systematically arranged within the ca in a manner to be subsequently described.

Figure 2:
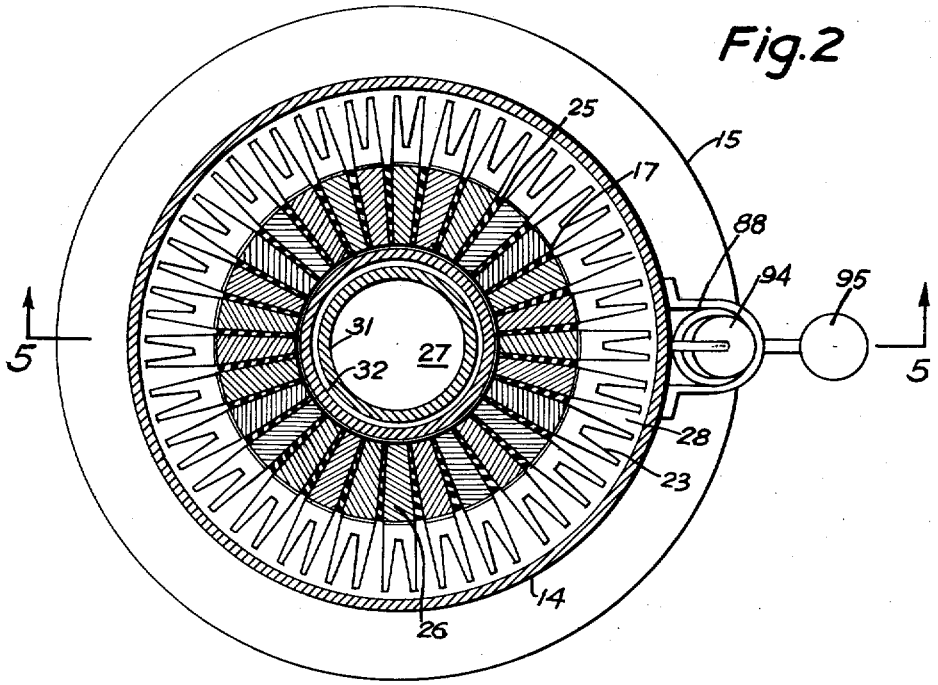
FIGURE 2 is a sectional view taken along the 2—2 of FIGURE 1.
Figure 4:
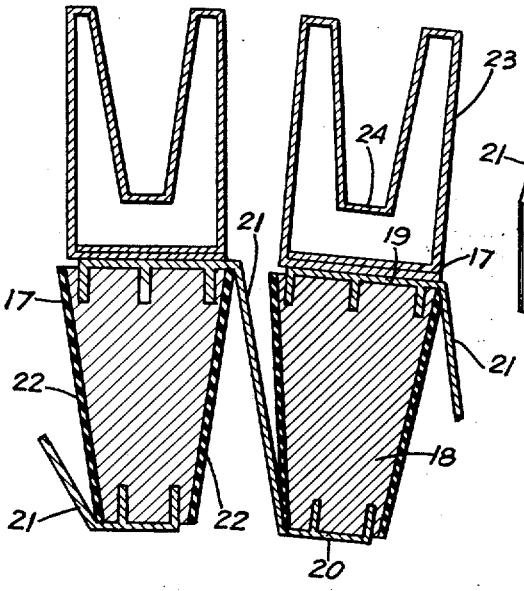
FIGURE 4 is an extended view of two of the the electric elements connected together in a linear arra ment.
Figure 3:
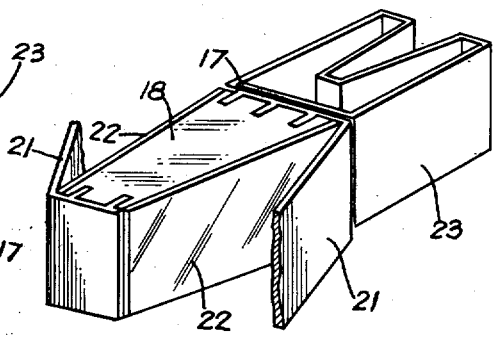
FIGURE 3 is a perspective view of a thermo-ele element which is employed in this solar generator.

The thermo-electric element 17 comprises a bloc which consists of a thermo-electric alloy so characte that upon application of heat to the alloy consider currents are generated at the surface of the block. block has an outer surface 19 and an inner surface These currents are taken from the alloy by means of m lic strips or conductors 21 which form thermo-ele junctions with the block 18. Each of the strips, or ductors 21, is in contact with the outer surface 19 of element and the inner surface 20 of the adjacent elen The blocks 18 are insulated from each other by m ulating strips 22. A copper strip 23 is secured to ıter surface 20 of each block to serve as a cooling r said outer surface. This strip is preferably of the thickness as the block 18 and has the center porhereof bent into a U-shaped configuration, as indiat 24. With this arrangement, the inner surface each block is employed to form the hot junction and uter surface 19 to form the cold junction of the o-electric unit.

h of the blocks 18 is substantially wedge-shaped h a manner that a plurality of the thermo-electric 17 are assembled in a single plane to form an an-25, as indicated in FIGURE 2. A plurality of the 25 are then stacked upon each other to form ow cylinder 26, having a central core 27. The holylinder 26 is positioned within the outer casing 14 t upon the base 15. This results in the formation annular space 28 within which are disposed the copoling strips 23 of each of the thermo-electric ele-17. A suitable coolant is circulated through the ır space 28 in order to cool the outer surfaces 19 of of thermo-electric elements. This cooling procıy be accomplished in any suitable and well-known ır and, hence, it is not necessary to describe the coolucture.

louble-walled cylinder 29 is positioned within the l core 27. The double-walled cylinder 29 has an wall 30 and an inner wall 31. The walls 30 and 31 e either metal or ceramic depending upon the par-' use to which the double-walled cylinder is to be d. Suitable means are provided to circulate water en the walls of the cylinder. The water may serve f several functions. If desired, water may be cird in order to cool the heated inner surfaces of the o-electric elements.

varying the cooling effect of the water the temperof the inner faces of the thermo-electric elements e controlled. This enables the generated E.M.F. closely regulated.

ter may also be pumped between the walls of the e-walled cylinder in order to equally distribute the ver the surface of the central core 27. Or, if dethe water may be converted into steam from the conted solar heat waves by providing suitable connecto circulate feed water between the walls of the cyland suitable apparatus to utilize the steam power.

ning now to the heat ray concentration system 13, strated in FIGURES 1 and 6, this system comprises ctor 32 which is mounted upon the top end of the tor unit 12 by means of a supporting plate 33. ıpporting plate 33 also serves to close the open end cylindrical outer casing 14. Suitable openings 34 are ed in the supporting plate 33 in order to circulate ıble fluid within the annulus 28 of the generating reflector 32 has a highly polished inner surface 35 essentially in the shape of a parabola so as to conte the heat rays of the sun, as represented by the 36 into a second reflector 37 mounted by means table supporting members 38 at substantially the oint of the reflector 32. The second reflector 37, n, further concentrates the heat rays of the sun rects them to a lens 39 which covers the top open the central core 27 of the generator unit 12. The is so ground as to form these converging heat rays ıin cylindrical beam 40 and to direct this beam of energy along the central axis of the central core 27 generating unit 12. This beam of solar energy 40 cted to a metallic mass 41 which is located at the ı end of the central core 27. This metallic mass y be highly polished and curved so as to reflect lar beam 40 [along the central axis of the central 7] *against the wall of the central core 27,* or may ı black surface so as to absorb the beam of solar and subsequently become heated.

In order that the solar generator may perform efficiently, it is necessary that the reflector 32 be facing the sun at all times. In this way the maximum quantity of solar energy is collected upon the reflector. Various mechanisms have been proposed in the past to provide a device which is directed towards the sun at all times. Such devices are termed heliostats. This apparatus employs a heliostat mechanism which is enclosed within a housing 42 and illustrated in FIGURE 6. While any suitable and well known heliostat mechanism may be employed, the particular mechanism which is about to be described is suitable.

Projecting upwardly from the housing 42 is a rotatably mounted hollow shaft 43, the end of which is pivotally connected to a bracket 44 secured to the base 15 of the generator unit 12. The open lower end of the shaft 43 is mounted upon a solid shaft 45, which is rotatably mounted in a suitable bearing 46. A suitable ratchet mechanism (not shown) is provided between the hollow shaft 43 and the solid shaft 45 to enable the hollow shaft 43 to rotate in one direction only with respect to the shaft 45.

A plate 47 is integrally mounted on the lower portion of the shaft 43. This plate has mounted thereon an electric motor 48 which, through a worm gear 49, drives a shaft 50 upon the end of which is fixedly mounted a bevel gear 51. The bevel gear 51 engages a pair of freely rotating bevel gears 52 and 53. The bevel gear 53 is freely mounted upon a shaft 54 upon which is mounted a clutch member 55. The clutch member 55 has an annulus of teeth at each end, which teeth are adapted to engage cooperating teeth on the inner faces of the bevel gears 52 and 53. The clutch 55 is mounted upon an arm 56 which is pivotally mounted at approximately its midpoint by means of a pin 57. The top end of the arm 56 is connected by means of a link 58 to a second arm 59 which is pivotally mounted at 60. Mounted upon the arm 59 is an armature 61 which is positioned to be attracted by either one of the solenoids 62 and 63. Actuation of either solenoid 62 or 63 will result in the attraction of the armature 61. This, in turn, will cause the arm 59 to pivot and this pivoting motion will be transmitted to the arm 56 by means of the link 58. The movement of the arm 56 will, in turn, result in axial movement of the clutch 55 into engagement with either the bevel gear 52 or 53. Since the clutch 55 is fixed upon the shaft 54 engagement of the clutch with either bevel gear 52 or 53 will determine the rotation of the shaft 54.

A spur gear 64 is fixed upon the other end of the shaft 54 and engages a second spur gear 65. The spur gear 65 is mounted upon a shaft 66 upon the end of which is a bevel gear 67 in engagement with a bevel gear 68 which is rigidly fastened upon the end of a threaded shaft 69 journalled at each end within the hollow shaft 43. There is a traveling nut 70 threadedly cooperating with the threaded shaft 69 and a link 71 pivotally connected at one end to the traveling nut 70 and pivotally connected at the other end to a bracket 72 fixed to the base 15 of the generator unit 12.

The solid shaft 45 is driven by means of a bevel gear 73 thereon which engages a driving bevel gear 74 mounted upon a shaft 75 extending from an electric motor 76. Mounted on the solid shaft 45 and integral with the gear 73 is a gear 77 which engages a worm 78. The worm 78 is fixed to rotate with a worm wheel 79 which in turn engages a worm 80 affixed on the end of a shaft 81. The shaft 81 has a worm wheel 82 secured thereon which engages a worm 83 affixed to an end 84 of the shaft 50. Thus the electric motor 48 serves both to rotate the solar generator to follow the daily movement of the sun and to drive the threaded shaft 69 to vary the angle of the generator as the declination of the sun changes.

To actuate the above described heliostat mechanism, reference is next made to the circuit diagram illustrated in FIGURE 10 and the sectional view depicted in FIG- URE 9. A mercury vapor switch 85 sufficiently sensitive to be actuated by the heat of the sun, is mounted upon the outer surface of the second reflector 37. The switch 85 is connected in series with the electric motor 76 and a storage battery 86. Also in series with the electric motor 76 is a mercury switch 87 having a gas filled body 87a such as illustrated in FIGURE 7, which is closed when the gas filled body is not heated. This mercury switch 87 is disposed within the center of a cylindrical casing 88 mounted on one side of the outer casing 14 of the generator unit 12. The mercury switch 87 is suspended so that it will be in a vertical operative position at all angles of the generator unit.

A second mercury switch 89 is mounted adjacent the mercury switch 87. The mercury switch 89 is the type illustrated in FIGURE 8, which is adapted to be closed when a gas filled body 89a is heated. The switch 89 is connected in series with the electric motor 48 which is also connected across the storage battery 86.

Also located within the cylindrical casing 88 are a pair of mercury switches 90 and 91 which are of the type adapted to be closed when their respective gas filled bodies are heated. The mercury switch 90 is connected so as to actuate the solenoid 62 and the mercury switch 91 is connected to actuate the solenoid 63. The mercury switches 90 and 91 are located to one side of the mercury switches 87 and 89 and are also suspended so as to be in a vertical opposite position at all times. The mercury switches 87 and 89 are located at the focal point of a reflector 92 located at the bottom of the cylindrical casing 88 and having a diameter substantially equal to the internal diameter of the cylindrical casing. A plurality of smaller reflectors 93 are mounted above the reflector 92 around the periphery thereof. Half of the total number of reflectors 93 indicated at A are positioned to concentrate heat rays upon the mercury switch 90 and the other half of the reflectors 93 indicated at B are positioned to concentrate rays upon the mercury switch 91. It is pointed out that the mercury switches 87 and 89 through 91 are suspended by short lengths of cord or the like in order that they will at all times be in the focal points of their respective reflectors.

Heat rays of the sun are reflected into the cylindrical casing 88 by means of a reflector 94 mounted on the outer wall of the cylindrical casing 14. Reflector 94, in turn, receives heat rays from a second reflector 95 which is fixedly mounted so as to reflect at all times to the reflector 94.

With the above description of the heliostat mechanism in mind, the modus of operation will now be described. The mercury switch 85 is so positioned as to be actuated by the first sun rays received at the beginning of the day. Actuation of the mercury switch 85 will, in turn, result in energization of the electric motor 76. Electric motor 76 represents a coarse control over the rotative movement of the solar generator. Operation of the electric motor 76 will accordingly rotate the hollow shaft 43 and the solar generator 12 to a position to where the heat rays of the sun are reflected into the cylindrical casing 88. When the heat rays of the sun are received in the casing 88, they will subsequently be reflected by the reflector 92 to heat the mercury switch 87. This, in turn, will open the mercury switch 87 and stop operation of the motor 76. At this point, however, the mercury switch 89 which is also located so as to be heated by sun rays reflected from the reflector 92 will close and will energize the electric motor 48. The electric motor 48 is geared to the hollow shaft 43 to rotate the shaft at a speed equal to the apparent speed of the sun as it appears to move from east to west during the day. Consequently, when the heat rays of the sun are reflected within the cylindrical casing 88 to actuate the electric motor 48, the solar generator will be directed at the sun at all times when the sun is shining. Should the sun disappear behind a cloud, electric motor 48 would cease to operate and the solar generator would cease to rotate about the heliostat mechanism. However, as soon as the sun reappeared from behind the clouds, the mercury switch 85 would be actuated and the solar generator again would be directed at the sun through the procedure previously described.

In order to correct the angular position of the generator unit so that the central axis on the generator unit coincides with the declination of the sun, the mercury switches 90 and 91 serve to actuate the corresponding solenoid in order to increase or decrease the angle of the generating unit. The diameter of the cylindrical casing 88 is small in respect to its length. The heat rays of the sun reflected into the casing will be received by either the four reflectors associated with the mercury switch 90 or the four reflectors similarly associated with the mercury switch 91. Should the angle of the generating unit be greater than the angle of declination of the sun, heat rays from the sun will be reflected into the cylindrical casing 88 to be reflected from the reflectors associated with mercury switch 90 and subsequently close said mercury switch. This, in turn, will result in the energization of solenoid 62 with the resultant attraction of the armature 61 towards solenoid 62. Consequently, the arm 56 is pivoted so as to place the clutch 55 into engagement with the bevel gear 53. Through the system of gears interconnecting the bevel gear 53 with the threaded shaft 69, shaft 69 will rotate in a counter-clockwise direction. The cooperating threads on the threaded shaft and the traveling nut are so selected that counter-clockwise rotation of the threaded shaft results in a downward movement of the traveling nut; this downward movement of the traveling nut results in lowering and thereby decreasing the angle of the generating unit. When the angle of the generating unit corresponds with the declination of the sun, the heat rays of the sun will be focused by the reflectors 94 and 95 to a point approximately in the center of the cylindrical casing 80. Therefore, few, if any, of the heat rays will contact the mercury switch 90 with the result that the switch will quickly cool off and will become open, thereby de-energizing the solenoid 62.

Therefore, it can be seen with the heliostat mechanism employed with this apparatus, the solar generator will be directed at the sun at all times.

Returning now to the solar generating unit and the structure employed in producing electrical energy from solar energy, it should be borne in mind that any one of several different methods may be used. Each one will be discussed in turn.

Figure 5:
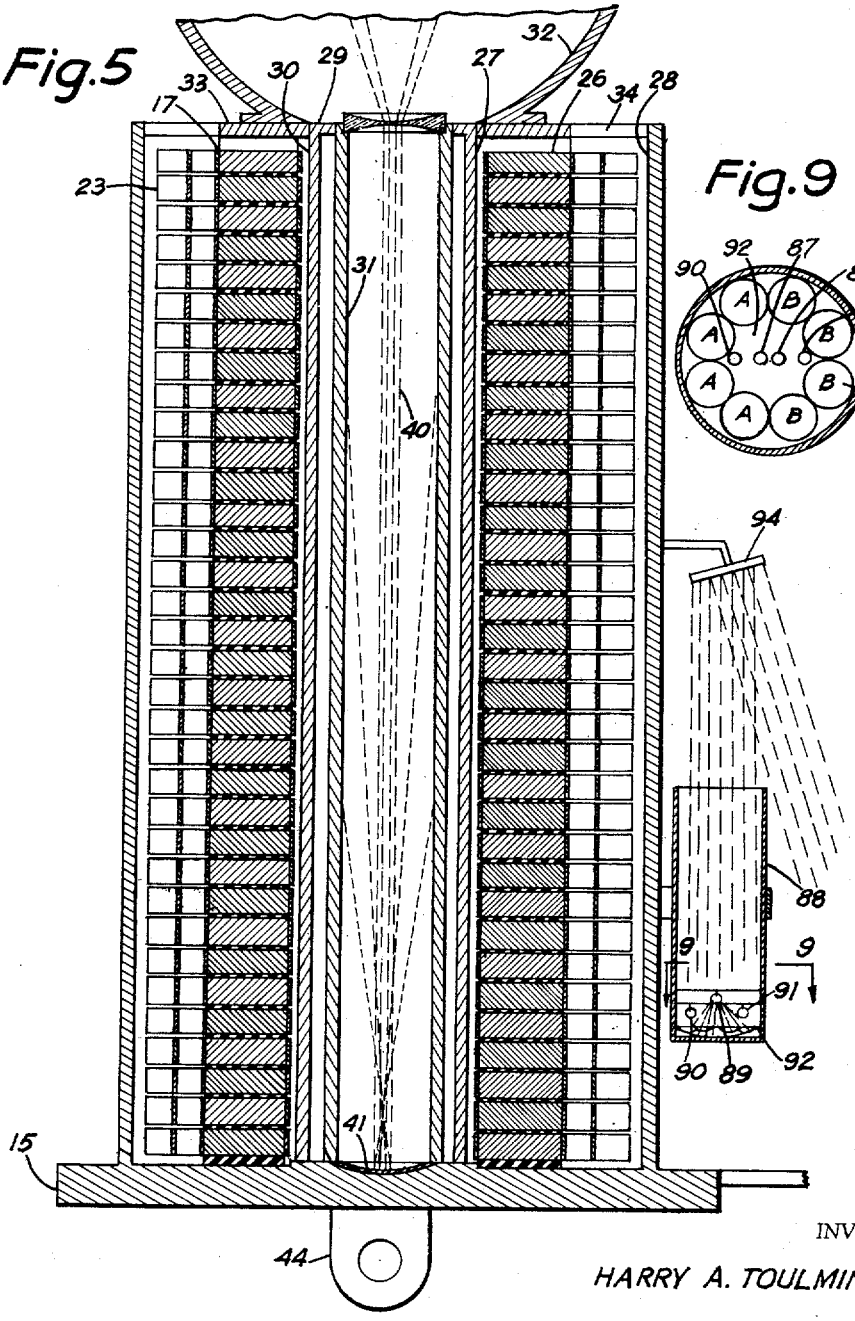
FIGURE 5 is a sectional view taken along the 5—5 of FIGURE 2.
Figure 9:
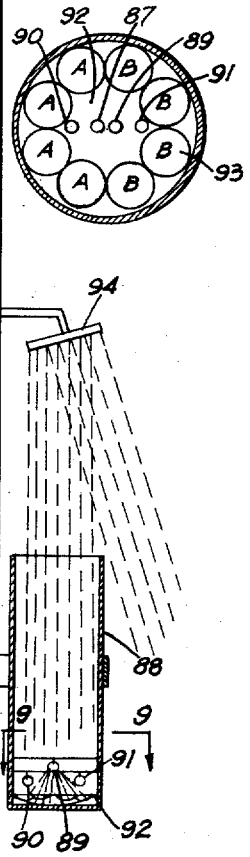
FIGURE 9 is a sectional view taken along the 9—9 of FIGURE 5, showing in detail the arrangeme the mirrors to actuate the heliostat mechanism.

As pointed out previously, the generator unit may be employed with or without a double-walled tube disposed within the hollow core of the cylinder of thermo-electric units. In the event that the double-walled cylinder is not used, several methods are possible by which the thermo-electric elements may be energized. As indicated previously, and as illustrated in FIGURES 5 and 6, the lens 39 may be so chosen as to direct the heat rays of the sun in a thin cylindrical beam 40 along the central axis of the generator unit. The thermo-electric elements should be so mounted in the cylinder that the inner faces of the elements are virtually contacting *the reflected rays of* the solar beam 40 *as reflected by mass 41*. The energy inherent in the solar beam 40 will result in heating of the inner surfaces 20 of the thermo-electric elements 17. As the outer surfaces 19 are suitably cooled, an E.M.F. will be generated across the alloy block 18 and a current will flow between the inner and outer faces of the thermo-electric element. As indicated in the circuit diagram in FIGURE 10, the electric conductors or strips 21 between the thermoelectric elements 17 are connected in series so that the E.M.F. obtained from the solar generator is the combined E.M.F. in each of the thermo-electric elements. This power obtained from the solar generator may be then used to charge a battery 86 and, for example, to operate an electric motor 96 which is drivingly connected to a pump 97 located in a well 98. A suitable switch 105 is in circuit with the motor 96. A suitable voltage regulator 106 is employed to open the circuit when the battery 86 is charged. It is understood that the voltage and ampere output of the solar generator may be varied by connecting the thermo-electric elements in a series or parallel relationships.

Figure 11:
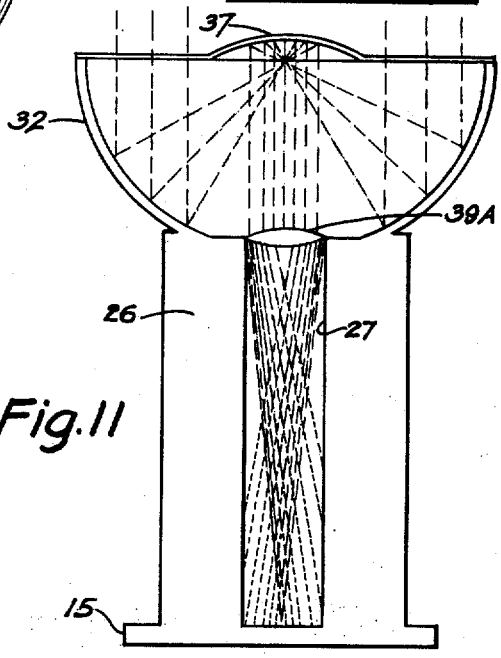

A modification of the manner in which the thermo-electric elements may be energized is illustrated in FIGURE 11. FIGURE 11 has a solar generator arranged therein similar to the arrangement disclosed in FIGURE 5. However, a lens 39a is positioned at the open end of the hollow core 27 which focuses the concentrated heat rays of the sun at various points along the central axis of the generating unit. In effect, a series of spots are provided along the central axis of the generating unit at which the heat rays of the sun are concentrated. The inner faces of the thermo-electric elements are subsequently energized in the same manner as previously described. It is pointed out, however, that the closed central portion 27 may be filled with a gas such as mercury vapor which has a good heat conductive characteristic in respect to gases. By employing such a heat conductive gas, the efficiency of the generator may be increased.

Figure 13:
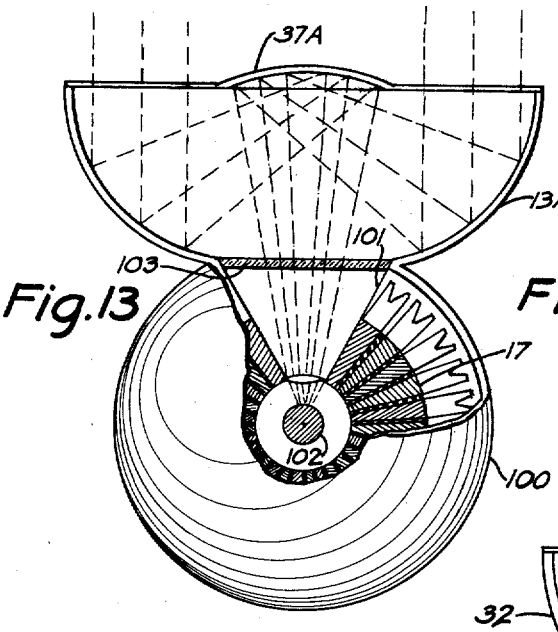
Figure 14:
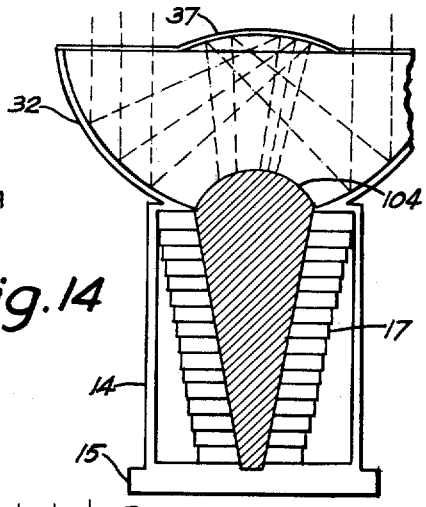
Figure 12:
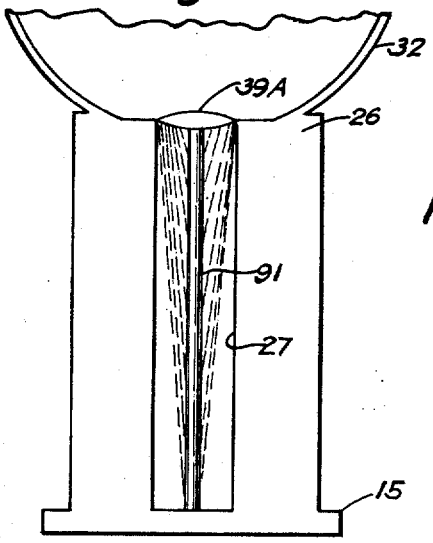

Several additional modifications of the solar generator unit are disclosed in FIGURES 12, 13 and 14. In each of these modifications a metallic mass is provided upon which the concentrated sun rays are directed. The resultant heating of this metallic mass, in turn, serves to heat the inner faces of the thermo-electric elements, either through conduction or by radiation.

The modification disclosed in FIGURE 12 employs an arrangement of components similar to that proposed in FIGURE 11. However, an additional component in the form of a metallic rod 99 is mounted along the central axis of the hollow cylinder. Consequently, the heat rays of the sun are concentrated upon different points along the metal rod 99 through the use of the lens similar to 39a as described above. The subsequent heating of the rod 99 will, in turn, heat the atmosphere, which may comprise a heat conductive gas, and will consequently heat the inner faces of the thermo-electric elements to energize said elements.

In the modification disclosed in FIGURE 13, a plurality of thermo-electric elements 17 are arranged in the form of a hollow sphere 100. This sphere has an opening 101 in the wall thereof. A concentration system 13a is mounted upon the sphere 100 in such a manner that the heat rays from the sun are concentrated by the second reflector 37a upon a metallic sphere 102 mounted in the center of the hollow sphere 100. In addition, the center of the hollow sphere 100 may be filled with a heat conductive gas such as mercury vapor and sealed by a transparent member, as indicated at 103.

It is noted that in this modification the heat rays are concentrated at a single spot, namely, the metallic sphere 102. Consequently, this sphere may be heated to a very high temperature dependent upon the characteristics of the metal comprising this sphere. Consequently, the inner surfaces of the thermo-electric elements may be heated to a higher temperature than with the embodiment disclosed in FIGURES 1 to 10. By suitably cooling the outer surfaces of the thermo-electric elements, as previously described, a considerably greater temperature gradient is obtained within each of the thermo-electric elements. As a result of this greater temperature gradient, higher E.M.F.'s are generated in each of the elements. The result is a solar generator which has a higher ampere and voltage output than the embodiment previously described.

In the embodiment disclosed in FIGURE 14, the solid tapered metallic core 104 is mounted within the central core of a plurality of thermo-electric elements arranged to form a tapered cylinder. The thermo-electric elements are so positioned in respect to the metallic core 104 that the inner surfaces of each of the thermo-electric elements are in contact with the surface of the tapered metallic core. A concentration system is employed which concentrates the heat rays of the sun upon the upper end of the metallic core 104. As the concentrated heat rays are distributed over the top face of the metallic core 96, the metallic core will subsequently become heated. This heat will, in turn, be transmitted to the inner faces of each of the thermo-electric elements. The resulting solar generator is a unit wherein the heat of the concentrated heat rays from the sun is transmitted directely to the thermo-electric elements through the medium of the metallic tapered core.

It is pointed out in each of the embodiments of this invention as described above, that the heat rays of the sun are first concentrated and subsequently employed to energize the hot junctions of thermo-electric elements. Furthermore, the metallic conductor to receive the concentrated energy from the heat rays may or may not be employed as desired. This decision will rest upon the particular application of the solar generator.

Thus it can be seen that the solar energy apparatus, as described, is simple in construction and efficient in operation. Furthermore, the structure of the disclosed solar generating apparatus is such that conventional thermo-electric elements may be employed. Not only is the disclosed solar generator capable of converting solar energy into electrical power but the solar generator is mounted upon a heliostat mechanism which continually directs the generator toward the sun. The resulting structure is a solar energy apparatus which may be readily mounted at virtually any geographic location and economically produce electrical power from solar heat rays.

It will be understood that this invention is susceptible to modification in order to adapt it to different usages and conditions, and, accordingly, it is desired to comprehend such modifications within this invention as may fall within the scope of the appended claims.

What I claim is:

1. In a solar generator, a plurality of thermo-electric elements arranged to form a hollow cylinder having an inner wall, means comprising a lens system to concentrate heat rays of the sun into a beam within said cylinder proximate to but spaced from the inner wall thereof [to energize said elements by radiation from said beam], and means *within* [at the bottom of] said hollow cylinder to reflect the beam of heat rays against the inner wall of said cylinder to [further] energize said thermo-electric elements.

2. A solar generator unit comprising a plurality of thermo-electric elements arranged to form a hollow cylinder having an inner wall, means comprising a lens system to concentrate rays of the sun into a beam within said cylinder and spaced from the inner wall thereof [to energize said elements by radiation from said beam], and means *within* [at the bottom of] said hollow cylinder to reflect the beam of [heat] rays against the inner wall of said cylinder to [further] energize said thermo-electric elements.

3. A solar generator unit comprising a plurality of thermo-electric elements arranged to form a hollow cylinder, means closing each end of said hollow cylinder to define a closed chamber with the means on one end comprising a lens for concentrating the heat rays of the sun in a cylindrical beam into said chamber [whereby said elements are energized], the means closing the *other* [bottom] end of said cylinder comprising a reflector for reflecting the heat rays against the elements forming the hollow cylinder to [further] energize said elements, [there being] *and* a heat-conductive gas contained within said closed chamber.

4. A solar generating unit comprising a plurality of thermo-electric elements arranged to form a hollow cylinder, means closing each end of said hollow cylinder to define a closed chamber, a double-walled tube disposed within said closed chamber, and means for concentrating the heat rays of the sun in a cylindrical beam into the core of said double-walled tube, the means closing the *other* [bottom] end of said cylinder comprising a reflector for reflecting the heat rays against the elements forming the hollow cylinder to further energize said elements.

5. A solar generating unit as claimed in claim 4, with means for circulating water between the walls of said double-walled tube.

6. A solar generator unit comprising a plurality of thermo-electric elements arranged to form a hollow cylinder having an inner wall, a lens system to concentrate the rays of the sun into one end of said cylinder in the form of a cylindrical beam having a diameter slightly less than the diameter of said hollow cylinder, the said beam of sun rays being spaced from said inner wall of said hollow cylinder [so that the thermo-electric elements comprising said inner wall are heated by heat radiating from said concentrated rays], and means at the other end of said hollow cylinder to reflect said concentrated rays back through said cylinder to [further] energize the thermo-electric elements.

7. A solar generator unit as claimed in claim 6 with said reflecting means reflecting said sun rays within said cylinder but not out of the said one end through which the rays enter.

*8. In a solar generator, a plurality of thermo-electric elements and closing means arranged to define a chamber having an inner wall, said closing means comprising a lens system to concentrate heat rays of the sun within said chamber to define a beam proximate to but spaced from the inner wall thereof, and means within said chamber to reflect the beam of heat rays against the inner wall of said chamber to energize said thermo-electric elements.*

*9. In a solar generator, a plurality of thermo-electric elements arranged to form a hollow cylinder having an inner wall, means comprising a lens system structurally combined with said hollow cylinder to concentrate heat rays of the sun into a beam within said cylinder, means within said hollow cylinder to reflect the beam of heat rays against the inner wall of said cylinder to energize said thermo-electric elements, and a heliostat mechanism supporting said cylinder so as to maintain the lens system end of the cylinder directed at the sun.*

*10. A solar generator unit comprising a plurality of thermo-electric elements and closing means arranged to define a chamber having an inner wall, said closing means comprising a lens system to concentrate rays of the sun within said chamber to define a beam, and means within said chamber to reflect the beam of heat rays against said inner wall of said chamber to energize said thermo-electric elements.*

*11. A solar generator unit comprising a plurality of thermo-electric elements arranged to form a hollow cylinder having an inner wall, means structurally combined with said hollow cylinder comprising a lens system to concentrate rays of the sun into a beam within said cylinder and spaced from the inner wall thereof, means within said hollow cylinder to reflect the beam of heat rays against the inner wall of said cylinder to energize said thermo-electric elements, and a heliostat mechanism supporting said cylinder so as to maintain the lens system end of the cylinder directed at the sun.*

*12. A solar generator unit comprising a plurality of thermo-electric elements arranged to define a chamber having an inner wall, a metallic mass within said chamber in heat-conducting relationship to said inner wall, and means comprising a lens system to concentrate rays of the sun onto said metallic mass within said chamber so as to energize the thermo-electric elements by radiation from said metallic mass.*

*13. A solar generator unit comprising a plurality of thermo-electric elements arranged to define a chamber having opposed openings therein, means closing said openings to define a closed chamber with the means on one opening comprising a lens for concentrating the heat rays of the sun into said chamber whereby said elements are energized, the means closing the other opening of said chamber comprising a reflector for reflecting the heat rays against the elements defining said chamber to further energize said elements, there being a heat-conductive gas contained within said closed chamber.*

*14. A solar generator unit comprising a plurality of thermo-electric elements arranged to define a chamber having an inner wall, a metallic mass within said hollow body in heat-conducting relationship to said inner wall, means structurally combined with said chamber and comprising a lens system to concentrate rays of the sun onto said metallic mass within said chamber so as to energize the thermo-electric elements by radiation from said metallic mass, and a heliostat mechanism supporting said chamber to maintain the lens system directed at the sun.*

References Cited in the file of this patent or the original patent

UNITED STATES PATENTS

| | | |
|---|---|---|
| 588,177 | Regan | Aug. 19, 1897 |
| 608,755 | Cottle | Aug. 9, 1898 |
| 2,253,771 | Dulaney | Aug. 26, 1941 |
| 2,269,337 | Dulaney | Jan. 6, 1942 |
| 2,290,902 | Wiegand | July 28, 1942 |
| 2,712,772 | Trombe | July 12, 1955 |

FOREIGN PATENTS

| | | |
|---|---|---|
| 26,782 | Great Britain | Nov. 17, 1910 |
| 108,354 | Switzerland | Mar. 2, 1925 |
| 732,338 | France | June 14, 1932 |